Patented Mar. 23, 1954

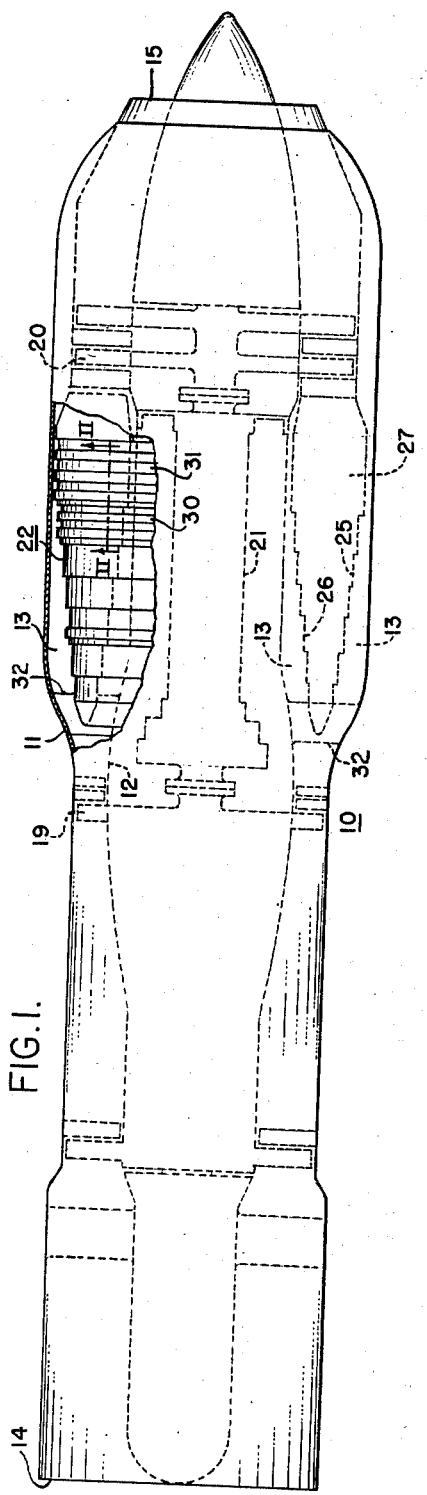

2,672,728

UNITED STATES PATENT OFFICE 2,672,728

REINFORCED COMBUSTION CHAMBER CONSTRUCTION

Charles H. Stockdale, Springfield, Pa., assignor to Westinghouse Electric Corporation, East Pittsburgh, Pa., a corporation of Pennsylvania Application May 23, 1951, Serial No. 227,913

3 Claims. (Cl. 60—39.65)

This invention relates to combustion apparatus, and more particularly to an annular combustion chamber liner or basket structure for a gas turbine power plant.

It is an object of the invention to provide an improved reinforced combustion chamber structure particularly adapted for use in aviation gas turbine engines.

In combustion apparatus of the annular type, the outer wall of the combustion chamber liner is essentially a large cylinder which, in operation of the apparatus, is subjected to a considerably greater gas pressure on its outer surface than that on its inner surface. This pressure differential makes desirable the reinforcement of the outer combustor wall to prevent deformation or collapse thereof under gas pressure loading. Provision of a satisfactory burner wall beam structure including inner and outer elements, such as straps built into an outer wall of the apparatus, has heretofore been difficult, largely because of the fact that temperatures encountered within the liner are vastly greater than temperatures outwardly thereof. Such a beam structure, having an inner element that becomes very hot while the outer element remains much cooler, may warp and crack upon development of differential thermal expansion of the elements. It is another object of the invention to provide a combustor liner embodying beam structure that is strong enough to resist buckling under gas pressure loads but flexible enough to accommodate any relative movement between the beam elements due to differential thermal expansion.

A further object of the invention is the provision of an improved combustion chamber structure having a reinforcing section comprising nested and interlocked cylinders, the inner cylinder having longitudinal corrugations and the outer cylinder having annular corrugations, the intersecting surfaces of which are welded together, so that both circumferential and axial expansion can be absorbed without imposition of excessive strain on the structure as a whole.

These and other objects are effected by the invention as will be apparent from the following description and claims taken in connection with the accompanying drawing, forming a part of this application, in which:

Fig. 1 is a longitudinal diagrammatic view, partly in section, of a typical aviation gas turbine power plant having combustion apparatus constructed in accordance with the invention;

Fig. 2 is an enlarged detail, longitudinal sectional view of a portion of the outer wall of the combustion apparatus taken substantially on line II—II of Fig. 1; and Fig. 3 is a fragmentary perspective view, in enlarged detail, of a combustor wall section shown in Fig. 2.

As illustrated in Fig. 1 of the drawing, a typical gas turbine power plant 10, with which the invention is adapted to be associated, may be mounted in a suitable compartment of an aircraft (not shown), and may comprise an outer generally cylindrical casing structure 11 having longitudinally mounted therein a core structure 12, forming an annular passageway, generally indicated at 13, which constitutes a fluid flow communication extending through the plant from a forwardly directed air inlet opening 14 to a rearwardly disposed exhaust nozzle 15. The usual operating components of the power plant 10 are arranged in axial alignment therein, and include an axial flow compressor 19, a driving turbine 20 connected thereto by means of a shaft 21, and annular combustion apparatus 22, which is interposed in the passage 13 between the discharge end of the compressor and the inlet of the turbine. In operation, air entering the inlet opening 14 is compressed by the compressor 19 and delivered through passage 13 to the combustion apparatus 22. Fuel supplied to the combustion apparatus, by way of suitable means (not shown), is burned in the stream of air under pressure, creating motive gases which are expanded through the turbine 20 and finally discharged to atmosphere through the nozzle 15, establishing a propulsive thrust.

The combustion apparatus 22 embodying the invention is preferably annular in form, although the features of the invention are readily adapted to be employed in combustion apparatus of the multiple unit or cell type, in case structural and operational characteristics of the power plant favor such design. The combustion apparatus 22 comprises outer and inner sectional annular walls 25 and 26, which are preferably formed of rolled chrome-nickel steel alloy and enclose a generally diverging combustion chamber 27. The outer wall 25 may consist of an assembly of a number of overlapped annular sections, including reinforcing units 30 and 31. The inner wall 26 may likewise constitute an assembly including overlapped sections which are concentric with those of outer wall 25. Suitable inlets for admitting air may be formed in both walls 25 and 26, by means of spacers interposed between the overlapping portions of the assembled sections. The forward wall sections may be supported on radially disposed struts 32 extending between the inner and outer casings 12 and 11.

The two reinforcing units 30 and 31 of the combustor outer wall 25 are similar in construction, although the unit 31 is slightly larger in diameter in the form of the invention chosen for illustration. With reference to Fig. 2, which shows portions of the two adjoining cylindrical reinforcing units in section, the larger unit 31 will be described as representative of both. According to the invention, the reinforcing unit 31 includes an inner annular wall section 31a having longitudinal corrugations, indicated by the reference character 35 in Fig. 3. Encompassing or telescoped over the section 31a is an outer annular bail section 31b having circumferential corrugations, or preferably, made up of a plurality of ring-shaped components each having a circumferential elevated channel portion 36 flanked by annular web portions 37. The corrugations 35 of the inner wall section thus extend parallel to the axis of the annular combustor apparatus, while the corrugations or annular channel portions 36 of the outer or bail section, are disposed normal thereto. The inner and outer sections 31b and 31a are suitably joined at the intersections of the respective corrugations. Preferably the elevated surfaces of the longitudinally corrugated section 31a are spot-welded to the inside surfaces of the respective web portions 37 of the bail section 31b at all crossing points, as indicated in Fig. 3. For facilitating continuous circulation of air in contact with adequate surface areas of the bail section 31b and the wall section 31a, a plurality of openings 38 are formed in the annular sides of the respective channel portions 36.

Referring to Fig. 2, it will be noted that the reinforcing unit 30, which is slightly smaller but similar in construction to the unit 31 just described, is provided with an extension flange 30a which is received into the adjacent end of the corrugated wall section 31a. With suitable spot-welds provided at the areas of contact between the flange 30a and section 31a, the intervening corrugations of the latter are left open to form passages for supplying air from the passage 13 (see Fig. 1) to the combustion chamber 27, as hereinbefore explained. It will be apparent that the opposite ends of the respective reinforcing units 30 and 31 are adapted to be similarly joined to other sections of the outer wall 25 in the assembly of the combustion structure 22.

With the improved reinforcing units 30 and 31 thus constituting integral beam structures in the cylindrical outer wall 25, the outer bail sections thereof will be strong enough to prevent buckling of the wall under any gas pressures that may be developed incident to usual operation of the power plant, while the annular corrugations formed therein will be sufficiently flexible to facilitate stretching longitudinally to whatever extent is required due to the expansion under the high temperatures to which the inner wall sections are subjected. At the same time, the circumferentially flexible longitudinal corrugations of the respective inner wall sections will permit thermal expansion without strain, facilitating relative adjustment thereof within whatever limitations in diameter are imposed by the outer bail sections.

While the invention has been shown in but one form, it will be obvious to those skilled in the art that it is not so limited, but is susceptible of various changes and modifications without departing from the spirit thereof.

What is claimed is:

1. Combustion apparatus comprising spaced cylindrical outer and inner wall assemblages forming an annular combustion chamber, at least one of said wall assemblages including a first cylindrical section having a plurality of circumferentially spaced longitudinal corrugations formed parallel to the axis thereof, and a second cylindrical section encompassing and engaging said first section and having a plurality of longitudinally spaced annular corrugations, the inner surfaces of the latter being secured to the elevations of said first section at the points of crossing of said corrugations, said cylindrical sections coacting to withstand differential thermal expansion of said wall assemblage and to prevent buckling thereof under the fluid pressure loading developed during operation of the combustion apparatus.

2. Combustion apparatus comprising coaxially aligned, cylindrical, partially telescoped wall assemblages forming a combustion chamber, at least one of said wall assemblages including a first cylindrical section having a plurality of circumferentially spaced longitudinal corrugations formed parallel to the axis thereof, and a second cylindrical section encompassing and engaging said first section and having a plurality of longitudinally spaced annular corrugations, the inner surfaces of the latter being secured to the elevations of said first section at the points of crossing of said corrugations, said cylindrical sections coacting to withstand differential thermal expansion of said wall assemblage and to prevent buckling thereof under the fluid pressure loading developed during operation of the combustion apparatus.

3. Apparatus as set forth in claim 1 characterized by the provision of lateral apertures in the circumferential corrugations of the said second or outer cylindrical section.

CHARLES H. STOCKDALE.

References Cited in the file of this patent

UNITED STATES PATENTS

| Number | Name | Date |
|---|---|---|
| 2,446,059 | Peterson | July 27, 1948 |
| 2,448,561 | Way | Sept. 7, 1948 |
| 2,537,033 | Christensen | Jan. 9, 1951 |
| 2,573,694 | De Zubay | Nov. 6, 1951 |
| 2,610,467 | Miller | Sept. 16, 1952 |